United States Patent [19]

Koyama et al.

[11] Patent Number: 5,324,571
[45] Date of Patent: Jun. 28, 1994

[54] MAGNETIC RECORDING MEDIUM COMPRISING A SUPPORT AND A PLURALITY OF LAYERS IN WHICH THE MAGNETIC LAYER HAS A SPECIFIED PLASTIC DEFORMATION

[75] Inventors: Noboru Koyama; Narito Goto; Ryosuke Isobe; Takahiro Mori, all of Tokyo, Japan

[73] Assignee: Konica Corporation, Tokyo, Japan

[21] Appl. No.: 12,317

[22] Filed: Feb. 2, 1993

[30] Foreign Application Priority Data

Feb. 5, 1992 [JP] Japan .................. 4-20182
Apr. 15, 1992 [JP] Japan .................. 4-122688

[51] Int. Cl.⁵ ................................ G11B 5/00
[52] U.S. Cl. ................................ 428/212; 428/328; 428/329; 428/336; 428/694 BM; 428/694 BN; 428/694 BH; 428/900
[58] Field of Search ............ 428/212, 328, 329, 336, 428/694 BM, 694 BN, 694 BH, 900

[56] References Cited

U.S. PATENT DOCUMENTS

| | | | |
|---|---|---|---|
| 4,720,411 | 1/1988 | Shimozawa et al. | 428/141 |
| 4,857,388 | 8/1989 | Ogawa et al. | 428/212 |
| 5,066,534 | 11/1991 | Goto et al. | 428/212 |
| 5,175,048 | 12/1992 | Inaba et al. | 428/213 |
| 5,178,935 | 1/1993 | Saito et al. | 428/212 |

FOREIGN PATENT DOCUMENTS 2-177125 7/1990 Japan.

OTHER PUBLICATIONS

*Encyclopedia of Polymer Science and Engineering* 1987 pp. 616, 617, 623.

*Primary Examiner*—Stevan A. Resan
*Attorney, Agent, or Firm*—Jordan B. Bierman

[57] ABSTRACT

A magnetic recording medium having plural layers are disclosed. A plastic deformation of an uppermost magnetic layer is from 0.01 to 0.5 $\mu$m, and a plastic deformation of the layer other than the uppermost magnetic layer is preferably from 0.01 to 0.6 $\mu$m. The uppermost layer preferably has a thickness of less 0.5 $\mu$m.

11 Claims, 2 Drawing Sheets

UPPER LAYER
LOWER LAYER
SUPPORT

MAGNETIC RECORDING MEDIUM COMPRISING A SUPPORT AND A PLURALITY OF LAYERS IN WHICH THE MAGNETIC LAYER HAS A SPECIFIED PLASTIC DEFORMATION

FIELD OF THE INVENTION

The present invention relates to a magnetic recording medium, more specifically to a magnetic recording medium which can prevent staining on calender rolls and has excellent electromagnetic conversion characterstics.

BACKGROUND OF THE INVENTION

Hitherto, the quality of conventional magnetic recording medium has been improved by either using finer magnetic powder or by incorporating a so-called multilayered constitution in which the top layer is a magnetic and the lower layer is a nonmagnetic layer as described in Japanese Patent Publication Open to Public Inspection (hereinafter referred to as Japanese Patent O.P.I. Publication) No. 187418/1988.

The technique disclosed in the above publication, however, give rise to a number of difficulties. It cannot increase the dispersibility of the magnetic or nonmagnetic powder in the coating composition employed to form a magnetic or nonmagnetic layer. It reduces how well the magnetic recording material can be calendered during the calendering process, thus preventing the magnetic recording medium from having the desired surface properties. Consequently, it is difficult to obtain a magnetic recording medium with excellent RF output and running durability, that is, properties a digital recording medium must have.

SUMMARY OF THE INVENTION

The object of the invention is to solve the above problems and to improve productivity of a magnetic recording medium by providing a magnetic recording medium suitable as a digital recording medium which excels in RF output and running durability.

The magnetic recording medium of the invention comprises a plurality of layers formed on a support, an uppermost magnetic layer having a plastic deformation ranging from 0.01 to 0.5 μm, and a layer other than the uppermost magnetic layer comprising nonmagnetic powder or material having high magnetic permeability.

The plastic deformation A of the uppermost magnetic layer ranges preferably from 0.01 to 0.5 μm. The plastic deformation B of the layer other than the uppermost magnetic layer ranges preferably from 0.01 to 0.6 μm.

The magnetic recording medium of a preferable embodiment of the invention has a deformation relationship where A and B satisfy 0.7 A < B < 1.3 A. One of the other magnetic recording medium of a preferable embodiment of the invention has the uppermost magnetic layer whose layer thickness is less than 0.8 μm, preferably 0.5 μm.

Figure 1:
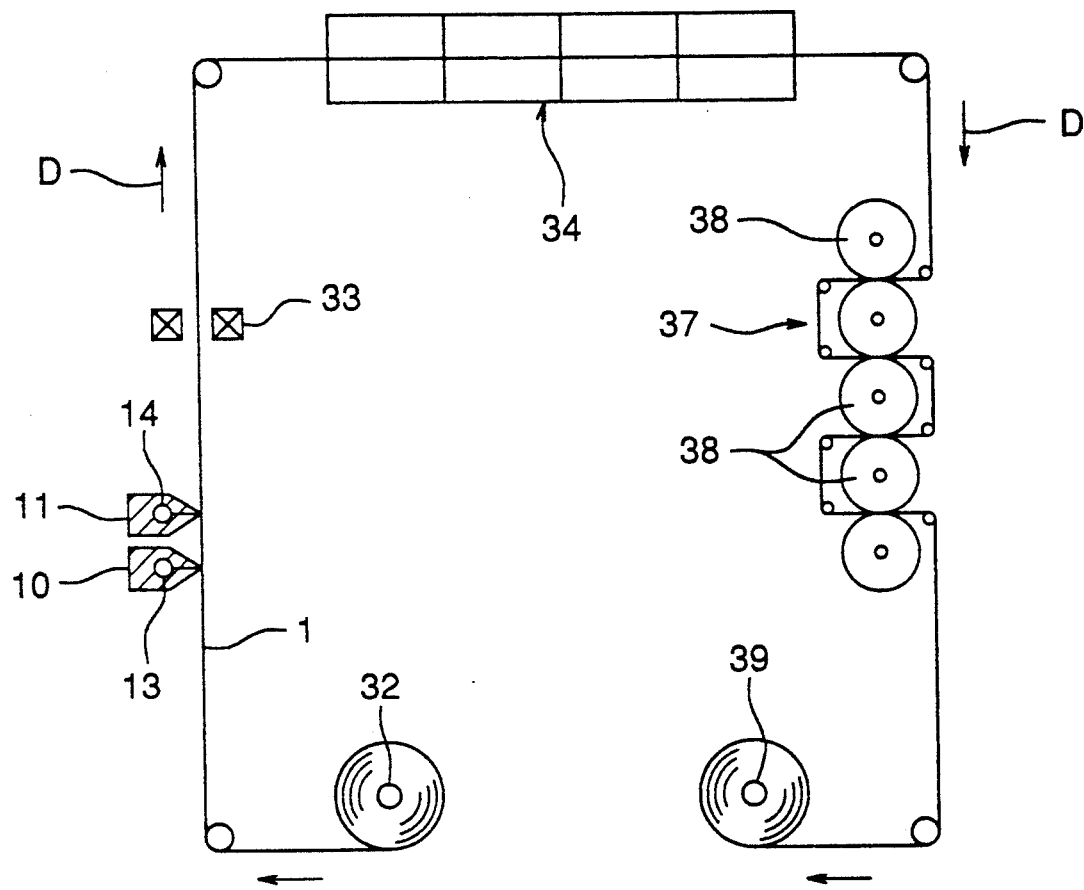
FIG. 1: Schematic for illustrating simultaneous application of multiple layers to form magnetic layers by the wet-on-wet method.

In the invention, the plastic deformation is defined as follows: under a temperature of 20° to 30° C. and a relative humidity of 40 to 80% an indenter is driven into the above magnetic layer at 1 to 25 nm/sec until the load measures 10 mg and then the load is released to zero at the same rate the load was applied, thereby the depth of the indentation formed in the magnetic layer is measured and taken as the plastic deformation.

Increasing the electromagnetic conversion characteristics of a magnetic medium by a smoother magnetic surface layer often results in staining on the calender rolls. This problem is eliminated by adjusting the plastic deformation to a specific range.

The method for measuring plastic deformation of the magnetic layer of the invention is hereunder described. The triangular pyramidal-shaped diamond indenter specified below is driven into the subject by means of a piezoelectric actuator under the following conditions.

| Indenter configuration: Triangular, angle between paired edges 80° | |
|---|---|
| Load: | 10 mg max. |
| Drive speed: | 1–25 nm/sec |
| Ambient conditions: | 20–30° C., 40–80% RH |
| Depth of indentation: | Within 1.0 μm from surface |

The indenter is driven into the magnetic layer until it applies a load of 10 mg. Then, the load is released at the drive speed. When the load measures 0, the depth of the indentation d is measured using a photonic sensor.

If the indentation depth made by the indenter when it starts applying a load is defined as $d_0$, the plastic deformation is determined by $d - d_0$. A sample having perfect elasticity will exhibit a plastic deformation of 0 μm.

Naturally, the above plastic deformation can be measured using other types of indenters, such as a square pyramid indenter. Tests using such indenters give similar results when the load, drive speed, temperature, and humidity are the same as above.

The magnetic layer coating film, which has moderate plasticity, is capable of withstanding high temperatures and pressures, and consequently fracturing and facilitates the forming of coating film by applied pressure. As a result, staining on calender rolls can be eliminated while maintaining excellent electromagnetic conversion characteristics of the magnetic medium.

The uppermost layer (hereinafter sometimes referred to as the top layer) of the magnetic layer .has a plastic deformation in the range of 0.01 to 0.5 μm, preferably 0.1 to 0.4 μm, and more preferably 0.1 to 0.3 μm.

When the top layer has a plastic deformation between 0.01 μm and 0.5 μm, the whole coating layer is able to dampen the pressure applied by the calender rolls, and thereby the break down is hardly occurred and causes no staining on the calender rolls. When the plastic deformation exceeds 0.5 μm, the calender makes the coating film too smooth making the running tape more prone to stick to the cylinder drum and thus stop. This tendency becomes more apparent with increasing temperature and humidity.

At least one of the layers other than the uppermost layer (hereinafter referred to as the lower layer) has a plastic deformation in the range of 0.01 to 0.6 μm, preferably 0.1 to 0.5 μm, and more preferably 0.1 to 0.4 μm.

When the plastic deformation of the lower layer is less than 0.01 μm, the flexibility of the coating film is reduced, causing increased loss in space between the magnetic head and the tape in contact (called head-beating) even when the plastic deformation of the top layer is within the above ranges. On the other hand, when the plastic deformation exceeds 0.6 μm, the coating film is more prone to be deformed abnormally even when the plastic deformation of the top layer is within the above ranges. Accordingly, the packing capability of the lower layer is enhanced while that of the top layer remains unchanged during calendering. The reason for this problem appears to be stress concentration on the lower layer that is more deformation-prone than the top layer.

When the plastic deformation of the above top layer is A and that of the above lower layer is B, it is preferable that the relationship $0.7A \leq B \leq 1.3A$ holds because the coating film density remains uniform, thereby tape running trouble does not occur and electromagnetic conversion characteristics are improved.

A and B preferably satisfy the relationship $0.8A \leq B \leq 1.2A$, and more preferably $0.9A \leq B \leq 1.1A$.

The plastic deformation of the aforementioned top and lower layers may be set in the above ranges by adjusting the crystallization temperature of the resin used as a binder (described later) to $-30°$ to $80°$ C. The crystallization temperature, for example of polyurethane resin, can be adjusted by varying the isocyanate content in the coating composition.

The crystallization temperature can also be adjusted by introducing polar groups mentioned later to increase the dispersibility of powder.

Layer Structure

The magnetic recording medium of the invention basically consists of a support, a magnetic layer (uppermost layer) formed thereon, and at least one layer between the magnetic layer and the support. It is preferable to form a back-coating layer on the face opposite to the magnetic layer (back side) to improve running performance of magnetic recording medium, and to prevent electrification and magnetic transfer. A subbing layer may also be formed between the magnetic layer and support.

Support

Materials which may be used to form a support are nonmagnetic materials and include polyesters such as polyethylene terephthalate and polyethylene-2,6-naphthalate, polyolefines such as polypropylene, cellulose derivatives such as cellulose triacetate and cellulose diacetate, and plastics such as polyamide and polycarbonate.

The support may take various forms, but generally come in the form of tapes, films, sheets, cards, discs, and drums.

The support may be of any thickness, but for those shaped into films or sheets the usual thickness is 3 to 100 μm, preferably 4 to 50 μm, for those shaped into discs and cards the thickness is about 30 μm to 10 mm, and for those shaped into drums a thickness based on the recorder size is used.

The support may have a single-layer or multilayer structure. In addition, it may be subjected to surface treatment such as corona discharging.

It is preferable to form a back-coating layer on the face opposite to (backside) the above magnetic layer formed on a support to improve running performance of magnetic recording medium, and to prevent electrification and magnetic transfer. As mentioned above, a subbing layer may also be formed between the magnetic layer and nonmagnetic support.

Magnetic Layer

In the invention, the uppermost layer is the magnetic layer. The magnetic layer primarily contains magnetic powder dispersed in a binder (binder resin).

It is preferable that this uppermost layer or magnetic layer comprises ferromagnetic iron oxide powder, ferromagnetic metallic powder and/or hexagonal magnetic powder (preferably in tabular form). It has a thickness of preferably less than 0.5 μm, and more preferably in the range of 0.1 to 0.4 μm.

Examples of the ferromagnetic iron oxide powder include $\gamma\text{-}Fe_2O_3$, $Fe_3O_4$, intermediate oxides thereof represented by $FeO_x$ ($1.33 < x < 1.5$), and Co-added intermediate oxides (cobalt-adsorbed) $Co\text{-}FeO_x$ ($1.33 < x < 1.5$).

Substances for ferromagnetic metallic powder used in the uppermost layer primarily consist of metals such as Fe and Co, and Ni. Examples thereof include Fe-Al type, Fe-Al-Ni type, Fe-Al-Zn type, Fe-Al-Co type, Fe-Al-Ca type, Fe-Ni type, Fe-Ni-Al type, Fe-Ni-Co type, Fe-Ni-Si-Al-Mn type, Fe-Ni-Si-Al-Zn type, Fe-Al-Si type, Fe-Ni-Zn type, Fe-Ni-Mn type, Fe-Ni-Si type, Fe-Mn-Zn type, Fe-Co-Ni-P type, and Ni-Co type. Among them, Fe-containing metallic powder has particularly excellent electrical characteristics.

From the viewpoint of corrosion resistance and dispersibility of powder, Fe-Al metallic powders such as Fe-Al type, Fe-Al-Ca type, Fe-Al-Ni type, Fe-Al-Zn type, Fe-Al-Co type, Fe-Ni-Si-Al-Co type, and Fe-Ni-Co-Al-Ca type are preferred.

Ferromagnetic metallic powder consisting mainly of iron is particularly preferred for achieving the object of the invention. This powder preferably contains Al, or Al and Ca, in an amount of 0.5 to 20 parts by weight of Al per 100 parts by weight of Fe and 0.1 to 10 parts by weight of Ca per 100 parts of Fe.

Making the Fe:Al proportion fall within the above range markedly increases resistance to corrosion of the powder, and making the Fe:Ca proportion fall within the above range enhances electromagnetic conversion characteristics, resulting in reduced signal drop-outs. It is not evident why electromagnetic conversion characteristics are enhanced and why drop-outs are reduced. Possible reasons are increased coercive forces caused by increased dispersibility and reduced amount of aggregates.

The ferromagnetic metallic powder of the invention has an average major axis length of less than 0.30 μm, preferably 0.10 to 0.20 μm, and more preferably 0.10 to 0.17 μm. Crystal size is less than 200 Å, in particular 100 to 180 Å. The axial ratio, i.e. average major-to-minor axial ratio of the crystals, is not more than 12, preferably not more than 10, and most preferably from 5 to 9. When the average major axis length and crystal size, and axial ratio of the ferro magnetic metallic powder are set within the above ranges, electromagnetic conversion characteristics can be further enhanced.

It is usually preferable that the coercive force (Hc) of the ferromagnetic powder used in the invention ranges from 600 to 5000 Oe. When coercive force measures less than 600 Oe, electromagnetic conversion characteristics are sometimes deteriorated. When it exceeds 5000 Oe, normal reading heads may fail to record data.

It is usually preferable that a magnetic property called saturation magnetization ($\sigma s$) is not less than 70 emu/g. When the saturation magnetization is below 70 emu, electromagnetic conversion characteristics may be deteriorated. It is preferable that ferromagnetic metallic metal powder has the value not more than 120 emu/g.

It is preferable that the ferromagnetic metallic powder has a specific surface area of not less than 30 m²/g, and in particular not less than 45 m²/g as measured by the BET method, in order to attain higher recording density.

This specific surface area and the associated measuring method are described in "Powder Measurement" by J. M. Dallavelle and Clydeorr Jr., translated into Japanese by Muta et al., published by Sangyo Tosho, and in "Kagaku Binran Ooyo Hen", pp. 1170 to 1171 (compiled by the Chemical Society of Japan, published by Maruzen Co., Ltd., Apr. 30, 1966).

Specific surface area is measured by, for example, degassing the subject powder by heating to about 105° C. for 13 minutes to remove substances adsorbed thereto, then introducing the powder into the measuring apparatus and carrying out the BET analysis at a liquid nitrogen temperature of −105° C. for 10 minutes using nitrogen at an initial pressure of 0.5 kg/m².

The measuring apparatus possibly used is Quantasorb (manufactured by Yuasa Ionics Co., Ltd.)

Preferred ferromagnetic powder contains Fe and Al atoms at a ratio of 1 to 20 Al atoms per 100 Fe atoms. At depths of not more than 100 Å from the surface as measured by the ESCA analysis, the content of Fe atoms to Al atoms is at a ratio of 30:70 to 70:30. Another preferred kind of ferromagnetic powder contains Fe and Ni atoms, and Al and Si atoms, as well as at least Co or Ca atoms: Fe atoms account for 90% of the total number of atoms, Ni atoms account for 1 to not more than 10% Al atoms account for 0 1 to not more than 5%, Si atoms account for 0.1 to not more than 5%, and Co atoms and/or Ca atoms account for 0.1 to not more than 13% (=total amount of Co and Ca when both are contained): At depths of not more than 100 Å from the powder surface as measured by the ESCA analysis, Fe atoms, Ni atoms, Al atoms, and Si atoms (Co and/or Ca contained) are Contained at a ratio of 100:(4 or less):(10 to 60):(10 to 70):(20 to 80).

Hexagonal magnetic powders preferably used in the invention include hexagonal ferrites. Such hexagonal ferrites comprise barium ferrite, strontium ferrite, or the like, in which an elemental Fe may be substituted with another element such as Ti, Co, Zn, In, Mn, Ge, and Nb. These magnetic ferrites are described in detail in IEEE Trans, on MAG-18, 16 (1982)

In the invention, a particularly preferred hexagonal magnetic powder is barium ferrite (hereinafter referred to as Ba-ferrite) powder.

Magnetic Ba-ferrite powder which may be used preferably in the invention has Fe atoms partially substituted with Co and Zn atoms, and has an average grain size (=length of diagonal of plane surface) of 300 to 900 Å, preferably 400 to 900 Å, an aspect ratio (=length of diagonal line of plane surface/thickness of particle) of 2.0 to 10.0, preferably 2.0 to 6.0, and magnetic coercive force (Hc) of 450 to 1500 Oe.

Substituting a part of Fe atoms with Co atoms controls coercive force of the Ba-ferrite powder to a suitable range. Further substituting a part of Fe atoms with Zn realizes higher saturation magnetization and provides magnetic recording medium having excellent electromagnetic conversion characteristics with high reproduction output; effects which cannot be obtained by substituting with Co alone. Further substituting a part of Fe atoms with Nb atoms provides excellent magnetic recording medium with even higher reproduction output. Also, a part of Fe atoms comprising Ba-ferrite used in the invention may be substituted with transition metal elements such as Ti, In, Mn, Cu, and Sn. The Ba-ferrite used in the invention is represented by the following formula:

$$BaO \cdot n((Fe_{1-m}M_m)_2O_3)$$

wherein M represents substituents preferably of two or more different metal elements whose average valence is 3, and is typically Co and Mn; m>0.36 (Co+Zn=0.08 to 0.3, Co/Zn=0.5 to 10); n is 5.4 to 11.0, preferably 5.4 to 6.0.

It is preferable that the average Ba-ferrite grain size is not less than 300 Å for magnetic recording medium to provide enough reproduction output, and not more than 900 Å for smoother surface and lower noise level. An aspect ratio of not less than 2.0 results in a magnetic recording medium whose perpendicular-orientation ratio of the magnetic powder is suitable for high density recording, and an aspect ratio of not more than 10.0 is preferable for a magnetic recording medium of smoother surface and lower noise level. For retaining recorded signals, the magnetic powder preferably has a coercive force of at least 450 Oe, and for preventing the recording head from magnetic saturation, it preferably has a coercive force of not more than 1500 Oe.

It is preferable that the hexagonal magnetic powder used in the invention has a saturation magnetization ($\sigma s$) of usually not less than 50 emu/g. When the saturation magnetization is less than 50 emu/g, electromagnetic conversion characteristics are sometimes deteriorated.

One preferred embodiment of Ba-ferrite used in the invention is a Co-substituted Ba-ferrite.

The hexagonal magnetic powder used in the invention can be prepared for example, by the following glass crystallization method. Oxidized and carbonated products of the elements necessary to form Ba-ferrite are melted together with glass-forming substance such as boric acid. The resultant molten product is quenched to obtain glass. Next, this glass is subjected to heat treatment at a prescribed temperature to deposit the Ba-ferrite crystals. Finally, the glass components are removed by heat treatment. Other methods available include the co-precipitation-calcination method, hydrothermal synthesis method, the flux method, the alkoxide method, and the plasma jet method.

In the invention, ferromagnetic metallic powder and hexagonal magnetic power may be used in combination.

The ferromagnetic metallic powder and/or hexagonal magnetic powder is present in the magnetic layer in an amount of usually 50 to 99 wt %, preferably 60 to 99 wt %, and particularly 75 to 90 wt %. Layer other than the uppermost layer comprising nonmagnetic powder or highly permeable material The magnetic recording medium comprises multiple layers formed on a support, wherein at least one layer other than the uppermost layer, preferably that adjacent to the uppermost layer, consists of nonmagnetic powder or highly permeable material.

Nonmagnetic powder

The nonmagnetic powder of the invention can be arbitrarily selected from various types of nonmagnetic powder available for this type of magnetic recording medium. They include powder comprising carbon black, graphite, titanium oxide, barium sulfate, ZnS, $MgCO_3$, $CaCO_3$, ZnO, CaO, tungsten disulfide, molybdenum disulfide, boric nitride, MgO, $SnO_2$, $SiO_2$, $Cr_2O_3$, $\alpha$-$Al_2O_3$, SiC, cerium oxide, corundum, artificial diamond, $\alpha$-iron oxide ($\alpha$-$Fe_2O_3$), $\alpha$-FeOOH, garnet, quartz rock, silicon nitride, boron nitride, silicon carbide, molybdenum carbide, boron carbide, tungsten carbide, titanium carbide, tripoli, diatomaceous earth, dolomite, and polymers such as polyethylene.

Of the above types of powder, preference is given to those comprising carbon black, $CaCO_3$, inorganic compounds such as titanium oxide, barium sulfate, $\alpha$-$Al_2O_3$, $\alpha$-iron oxide ($\alpha$-$Fe_2O_3$), $\alpha$-FeOOH, and $Cr_2O_3$, polymer such as polyethylene.

In the invention, it is further preferable to use nonmagnetic powder whose particles are needle-shaped because both the nonmagnetic uppermost layer and magnetic layer formed thereon can have smoother surface. Of the needle type nonmagnetic powder, preference is given to those comprising $\alpha$-$Fe_2O_3$ or $\alpha$-FeOOH, particularly $\alpha$-$Fe_2O_3$.

The major axis diameter of the particles in the aforementioned nonmagnetic powder is usually not more than 0.50 μm, preferably not more than 0.40 μm, and particularly not more than 0.30 μm, especially not more than 0.25 μm.

The minor axis diameter of the particles in the aforementioned nonmagnetic powder is usually not more than 0.10 μm, preferably not more than 0.08 μm, and particularly not more than 0.06 μm.

The axial ratio, i.e. the ratio of minor axis to major axis of the above particles in the nonmagnetic powder, is usually in the range of 2 to 20, preferably 5 to 15, and most preferably 5 to 10.

The specific surface area of the foregoing nonmagnetic powder is usually in the range of 10 to 250 m²/g, preferably 20 to 150 m²/g, and most preferably 30 to 100 m²/g.

When the nonmagnetic powder has a major axis diameter, minor axis diameter, axial ratio, and specific surface area within the above ranges, the nonmagnetic layer as well as the magnetic (uppermost) layer will have good surface conditions.

In the invention, it is preferable that the foregoing nonmagnetic powder is subjected to surface treatment using Si and/or Al compounds. Such surface-treated nonmagnetic powder improves the surface conditions of the magnetic (uppermost) layer. Both Si and Al are usually contained in an amount of 0.1 to 50 wt %, preferably 0.1 to 10, preferably 0.1 to 10 wt %, more preferably 0.1 to 5 wt %. The ratio of Si to Al is preferably Si/Al≧3 by weight. The surface treatment is conducted by a method disclosed in, for example, Japanese Ptent O.P. I No. 83219/1990.

The aforementioned nonmagnetic powder usually has an average grain size of 1 to 300 nm, preferably 1 to 100 nm, and most preferably 1 to 50 nm. When the nonmagnetic powder has average grain size within the above range, it does not adversely affect the surface conditions of the magnetic layer.

The aforementioned nonmagnetic powder in the nonmagnetic layer is contained in an amount of 5 to 99 wt %, preferably 60 to 95 wt %, and most preferably 75 to 95 wt % of the total components that constitute the nonmagnetic layer. When the nonmagnetic powder content is within the above range, the surface conditions of the magnetic layer will be improved.

Material with High Permeability

Highly permeable material has a coercive force, Hc, in the range of $0 < Hc \leq 1.0 \times 10^4$ A/m, preferably $0 < Hc \leq 5.0 \times 10^3$ A/m. Coercive force within the above range allows a material with high permeability to stabilize the magnetization region of the uppermost layer. Coercive force exceeding the above range is not preferable, because it causes the material to function as a magnetic material, and the magnetic recording medium may fail to exhibit intended properties.

In the invention, it is preferable to select suitable highly permeable materials having a coercive force within the above range according to the purposes. Materials with high permeability include soft magnetic metallic materials and soft magnetic oxide materials.

Examples of the above soft magnetic metallic materials include Fe-Si based alloys, Fe-Al based alloys (Alperm, Alfemol, Alfer), permalloy (Ni-Fe binary alloys, and polymetallic alloys obtained by adding Mo, Cu, or Cr added to the binary alloys), sendust (Fe-Si-Al alloy in which 9.6 wt % is Si, 5.4 wt % is Al, and the remaining 86 wt % is Fe), and Fe-Co alloys. Of the above, sendust is preferred. Soft magnetic metallic materials not mentioned above may also be used. They may be used singly or in combination of two or more types.

Examples of the above soft magnetic oxide materials include spinel ferrites such as $MnFe_2O_4$, $Fe_3O_4$, $CoFe_2O_4$, $NiFe_2O_4$, $MgFe_2O_4$, and $Li_{0.5}Fe_{2.5}O_4$, and Mn-Zn based ferrites, Ni-Zn based ferrites, Ni-Cu based ferrites, Cu-Zn based ferrites, Mg-Zn based ferrites, and Li-Zn based ferrites. Of them, Mn-Zn based ferrites and Ni-Zn based ferrites are preferred. These materials may be used singly or in combination of two or more types.

This highly permeable material may be pulverized into very fine powder by means of a ball mill or other grinder to a size of 1 to 300 nm, preferably 1 to 100 nm, and most preferably 1 to 50 nm. Very fine powder of a soft magnetic metallic material is obtained by atomizing the molten material into a vacuous atmosphere. On the other hand, that of soft magnetic oxide materials is obtained by the glass crystallization method, co-precipitation-calcination method, hydrothermal synthesis method, flux method, alkoxide method, and the plasma jet method.

Highly permeable materials are contained in a layer usually in an .amount of 5 to 99 wt %, preferably 50 to 95 wt %, and more preferably 60 to 95 wt % of total solid component. When highly permeable material content is within the above range, the magnetization of the uppermost layer can be effectively and sufficiently stabilized. When the content is below 5 wt %, the layer does not function as a highly permeable layer.

The highly permeable material-containing layer may contain nonmagnetic grains.

The magnetic recording medium of the invention preferably contains conductive powder in at least one of the layers other than the uppermost layer. Examples include pigments (for example, carbon black, graphite, tin oxide, silver powder, silver oxide, silver nitrate, organic compounds of silver; metallic powder such as copper powder; zinc oxide, barium nitrate, and titanium oxide) whose particles are coated with a film of conductive materials like tin oxide and solid antimony oxide solution.

The average size of the above very fine conductive powder is in the range of 5 to 700 nm, preferably 5 to 200 nm, and more preferably 5 to 50 nm.

The above very fine conductive powder is contained in an amount of 1 to, preferably 5 to 15 wt % per 100 wt % of nonmagnetic powder.

Binder

Typical examples of binders used to form the magnetic (uppermost layer) and/or layers other than the nonmagnetic layer include polyurethane, polyester, vinyl chloride resin such as vinyl chloride based copolymers. It is preferable that the resin comprises repeating units having at least one type of polar group selected from $-SO_3M$, $-OSO_3M$, $-COOM$ and $-OPO(OM^1)_2$, $-PO(OM^1)_2$, wherein M represents a hydrogen atom or an alkali metal such as Na, K, and Li; $M^1$ represents a hydrogen atom, an alkali metal atom such as Na, K, and Li, or an alkyl group.

The above polar groups can increase the dispersibility of ferromagnetic powder and are contained in the respective resins in an amount of 0.1 to 8.0 mol %, and preferably 0.2 to 6.0 mol %. When the amount falls below 0.1 mol %, the dispersibility of the ferromagnetic powder is reduced. When the amount exceeds 8.0 mol %, magnetic coating material has a greater tendency to gel. The weight average molecular weight of the above resins is preferably in the range of 15,000 to 50,000.

Binders are contained in the magnetic layer usually in an amount of 5 to 40 parts by weight, preferably 10 to 30 parts by weight per .100 parts by weight of ferromagnetic powder.

Binders may be used singly or in combination of two or more types. When used in combination, the above polyurethane and/or polyester, and vinyl chloride based resin is usually contained at a ratio of 90:10 to 10:90 parts by weight, preferably 70:30 to 30:70 parts by weight.

A polar group-containing vinyl chloride-based copolymer used as binder in the invention are synthesized by addition reaction of OH-containing copolymers such as vinyl chloride-vinyl alcohol copolymer with one of the following compounds having both a polar group and a chlorine atom.

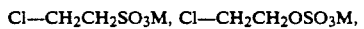
Cl—CH$_2$CH$_2$SO$_3$M, Cl—CH$_2$CH$_2$OSO$_3$M,

Cl—CH$_2$COOM, Cl—CH$_2$—P(=O) (OM$^1$)$_2$

Using Cl-CH$_2$CH$_2$SO$_3$Na as example, the reaction can be described as follows:

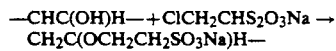
—CHC(OH)H—+ClCH$_2$CHS$_2$O$_3$Na →
CH$_2$C(OCH$_2$CH$_2$SO$_3$Na)H—

A polar group-containing vinyl chloride-based copolymer can be obtained as follows: An unsaturated bond-containing reactive monomer to which a repeat unit containing a polar group is introduced is loaded into a reactor vessel such as an autoclave, and then a typical polymerization initiator such as a radical polymerization initiator, e.g. BPO (benzoyl peroxide) and AIBN (azobisisobutyronitrile), a redox polymerization initiator, and a cationic polymerization initiator is used to start polymerization.

Typical examples of reactive monomer to which sulfonic acid or its salts are introduced include unsaturated hydrocarbon sulfonic acids such as vinylsulfonic acid, allylsulfonic acid, methacrylsulfonic acid and p-styrenesulfonic acid and salts thereof.

Those used to introduce carboxylic acid or its salts include (metha)acrylic acid and maleic acid, and those used to introduce phosphoric acid or its salts include (metha)acryl-2-phosphate.

It is preferable that an epoxy group is introduced into a vinyl chloride-based copolymer. Introducing an epoxy group improves the thermal stability of the copolymer. When introducing an epoxy group, the amount of the epoxy-containing repeat unit in the copolymer is preferably 1 to 30 mol %, and more preferably 1 to 20 mol %. A preferred monomer to which an epoxy group is introduced, is, for example, glycidyl acrylate.

Methods used to introduce a polar group into a vinyl chloride based copolymer are disclosed in Japanese Patent O.P.I. Publication Nos. 44227/1982, 108052/1983, 8127/1984, 101161/1985, 235814/1985, 238306/1985, 238371/1985, 121923/1987, 146432/1987, and 146433/1987. These methods may be used for the present invention.

Synthesis of polyester and polyurethane used in the invention when appropriate is described below. In general, polyester is obtained by reaction of polyol and poly-basic acid. Using this method, a polar group-containing polyester (polyol) can be synthesized from polyol and a poly-basic acid containing a polar group.

Examples of poly-basic acids containing a polar group include 5-sulfoisophthalic acid, 2-sulfoisophthalic acid, 4-sulfoisophthalic acid, 3-sulfophthalic acid, 5-sulfoisophthalic acid dialkyl, 2-sulfoisophthalic acid dialkyl, 4-suifoisophthalic acid dialkyl, 3-sulfoisophthalic acid dialkyl, and sodium salts and potassium salts thereof.

Examples of the polyol include trimethylolpropane, hexanetriol, glycerin, trimethylolethane, neopentylglycol, pentaerythritol, ethylene glycol, propylene glycol, 1,3-butanediol, 1,4-butanediol, 1,6-hexanediol, diethylene glycol, and cyclohexane dimethanol.

Other polyesters incorporating a polar group may be synthesized using conventional methods.

Polyurethane is hereunder described in detail.

Polyurethane can be obtained by reaction of polyol and polyisocyanate. The polyol used is a polyester polyol obtained by reaction of a typical polyol and poly-basic acid.

For this reason, using a polar group-containing polyester polyol as a starting material can synthesize a polar group-containing polyurethane.

Examples of the polyisocyanate include diphenylmethane-4-4'-diisocyanate (MDI), hexamethylene diisocyanate (HMDI), tolylene diisocyanate (TDI), 1,5-naphthalene diisocyanate (NDI), tolldine diisocyanate (TODI), and lysine disocyanate methyl ester (LDI).

Another effective method for synthesizing a polar group-containing polyurethane is addition reaction of OH-containing polyurethane and any of the following compounds containing a polar group and a chlorine atom.

Cl—CH$_2$CH$_2$SO$_3$M, Cl—CH$_2$CH$_2$OSO$_3$M,

Cl—CH$_2$COOM, Cl—CH$_2$—P (=O) (OM1)$_2$

Methods used to introduce a polar group into polyurethane are described in Japanese Patent Examined Publication No. 41565/1983, Japanese Patent O.P.I. Publication Nos. 92422/1982, 92423/1982, 8127/1984, 5423/1984, 5424/1984, and 121923/1987. These methods may be used in the invention.

In the invention, any of the following types of resin may be additionally used as a binder. The resin is contained preferably in an amount of not more than 20 wt % of the total amount of binder.

Examples of the resin have a weight average molecular weight of 10,000 to 200,000 and include vinyl chloride-vinyl acetate copolymer, vinyl chloride-vinylidene chloride copolymer, vinyl chloride-acrylonitrile copolymer, butadiene acrylonitrile copolymer, polyamide resin, polyvinyl butyral, cellulose derivative (e.g. nitrocellulose), styrene-butadiene copolymer, phenol resin, epoxy resin, urea resin, melamine resin, phenoxy resin, silicone resin, acryl-based resin, urea formamide resin, and various synthetic rubber resin.

Other Components

In the invention, it is preferable to incorporate polyisocyanate into the magnetic layer to enhance the layer's durability.

Examples of the polyisocyanate include aromatic polyisocyanates such as those obtained as an adduct of tolylene diisocyanate (TDI) and active hydrogen compound, and aliphatic polyisocyanates such as those obtained as an adduct of hexamethylene diisocyanate (HMDI) and active hydrogen compound. Preference is given to polyisocyanates with a weight average molecular weight in the range of 100 to 3000.

In the invention, additives such as a dispersing agent, a lubricant, abrasive agent, electrification controller, and filler may be added to the magnetic layer as necessary.

Examples of the dispersing agent include aliphatic groups having 12 to 18 carbon atoms such as caprylic acid, capric acid, lauric acid, myristic acid, palmitic acid, stearic acid, and oleic acid; alkali metal salts, alkaline earth metal salts, or amides of these acids; polyalkylene oxide alkyl acid ester; lecithin; trialkylpolyolefinoxy quaternary ammonium salt; and azo compounds containing carboxyl or sulfonic groups. These dispersants are usually employed in the range of 0.5 to 5 wt % of the total amount of ferromagnetic powder.

Fatty acids and/or fatty acid ester may be used as the lubricant. Fatty acid is added preferably in an amount of 0.2 to 10 wt %, more preferably 0.5 to 5 wt % of the total amount of ferromagnetic powder. When less than 0.2 wt % is added, smooth running of the magnetic recording medium is less likely. When the added amount exceeds 10 wt %, fatty acid can ooze out of the surface of the magnetic layer, or output level of the magnetic recording medium is prone to decrease.

Fatty acid ester is also preferably added in an amount of 0.2 to 10 wt %, more preferably 0.5 to 5 wt % of the total amount of ferro magnetic powder. When the addition amount is less than 0.2 wt %, the still wear resistance of the magnetic medium is prone to decrease, and if the amount exceeds 10 wt %, fatty acid ester can ooze out of the magnetic layer, or output level of the magnetic recording medium is prone to decrease.

In order to increase the lubricating effect by using both fatty acid and fatty acid ester, it is preferable that they are added at a ratio of 10:90 to 90:10 by weight.

The fatty acid, which may be mono-basic or di-basic acid, preferably contains 6 to 30, and more preferably 12 to 22 carbon atoms.

Examples of the fatty acid include captonic acid, caprylic acid, captic acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid.

Examples of the fatty acid ester include oleyl oleate, isocetyl stearate, dioleyl maleate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laurate, cetyl-2-ethylhexalate, dioleyl adipate, diethyl adipate, diisobutyl adipate, diisodecyl adipate, oleyl stearate, 2-ethylhexyl myristate, isopentyl palmitate, isopentyl stearate, diethyleneglycol-monobutyletherpalmitate, and diethyleneglycol-monobutylesterpalmitate.

Useful lubricants other than the above fatty acids and fatty acid esters include silicone oil, graphite, carbon fluoride, molybdenum disulfide, tungsten disulfide, fatty acid amides, and $\alpha$-olefin oxide.

Typical examples of the abrasive include ($\alpha$-alumina, fused alumina, chromium oxide, titanium oxide, ($\alpha$-iron oxide, silicon oxide, silicon nitride, tungsten carbide, molybdenum carbide, boron carbide, corundum, zinc oxide, cerium oxide, magnesium oxide, and boron nitride. The average abrasive size is preferably 0.05 to 0.6 $\mu$m, more preferably 0.1 to 0.3 $\mu$m.

The above abrasive is contained in the lower layer usually in an amount of 3 to 20 parts by weight, preferably 5 to 15 parts by weight, and more preferably 5 to 10 parts by weight.

Examples of the electrification controller include conductive powder such as carbon black and graphite; cationic surfactants such as quatenary amines; anionic surfactants containing an acid radical such as sulfonic acid, sulfuric acid, phosphoric acid, a phosphate, and carboxylic acid; amphoteric surfactants such as aminosulfonic acid; and natural surfactants such as saponin. The above electrification controller is usually added in an amount of 0.01 to 40 wt % of the total amount of binder.

Preparation of Magnetic Recording Medium

The magnetic recording medium of the invention may be prepared by various methods used to prepare single- or multi-layered magnetic recording medium.

In general, magnetic recording medium is prepared, for example, by kneading and dispersing, in a solvent, ferromagnetic powder, binder, dispersing agent, lubricant, abrasive, electrification controller, and other additives to prepare a magnetic coating composition, and then applying this coating composition to a support.

Examples of the above solvent include ketones such as acetone, methyl ethyl ketone (MEK), methyl isobutyl ketone (MIBK), and cyclohexanone; alcohols such as methanol, ethanol, and propanol; esters such as methyl acetate, ethyl acetate, and butyl acetate; cyclic ethers such as tetrahydrofuran; and halogenated hydrocarbons such as methylene chloride, ethylene chloride, carbon tetrachloride, chloroform, and dichlorobenzene.

Various kneader dispersers may be used to knead and disperse components employed for forming a magnetic layer.

Examples of the kneader disperser include a two-roll mill, a three-roll mill, a ball mill, a pebble mill, a Co-ball mill, a Tron mill, a sand mill, a sand grinder, a Sqegvari Attriter, a high-speed impeller disperser, a high-speed stone mill, a high-speed impact mill, a disper, a high-speed mixer, a homogenizer, an ultrasonic disperser, an open kneader, a continuous kneader, and a pressure kneader.

Of the above kneader dispersers, those which can provide a power consumption load of 0.05 to 0.5 kW per kg of magnetic powder are the pressure kneader, open kneader, continuous kneader, two-roll mill, and three-roll mill.

When preparing the magnetic recording medium of the invention, it is preferable to use the wet-on-wet multilayer-forming process in order to attain the effect of the invention.

More specifically, as shown in FIG. 1, on a film-shaped support 1 that has been spooled off a feed roll 32, the coating compositions for the respective magnetic layers are applied by the wet-on-wet method by means of extrusion coaters 10 and 11. After passing through orientating or perpendicularly orientating magnets 33, the support 1 is introduced into dryer 34 where it is dried by hot air blown from upper and lower nozzles. The support 1, now having dry coating layers, is then introduced into a super calendering apparatus 37, consisting of a plurality of calendering rolls 38, and undergoes calendering treatment. After calendering, the support 1 is taken up on a wind-up roll 39. The so-obtained magnetic film can be cut into tapes of a desired width to obtain, for example an 8-mm magnetic recording tape for video camera.

In the above method, each coating composition may be supplied to the extrusion coater 10 or 11 through an inline mixer (not shown). Each of the extrusion coaters 10 and 11 is provided with a liquid pan (13, 14), allowing coating composition supplied from one coater to be applied to the support and that from the other coater to be applied thereon by the wet-on-wet method. That is, after applying coating composition for the lower layer (when it is still wet), that for the magnetic layer is immediately applied.

Figure 2:
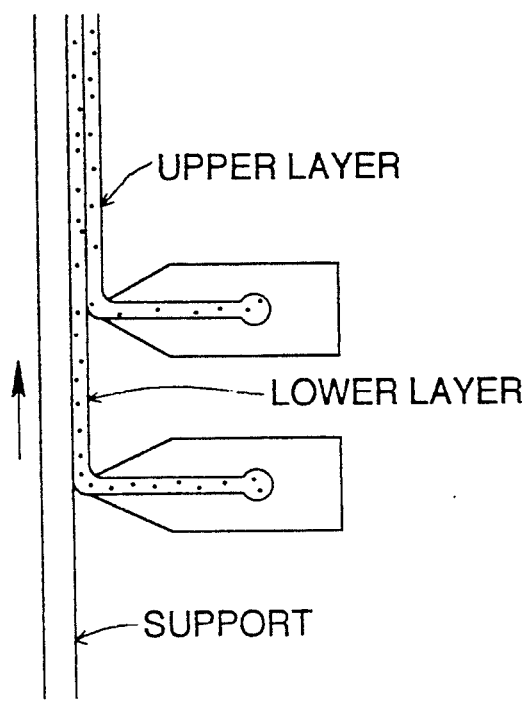
FIG. 2: Schematics view illustrating coater heads which apply coating composition of magnetic layers.
Figure 2:
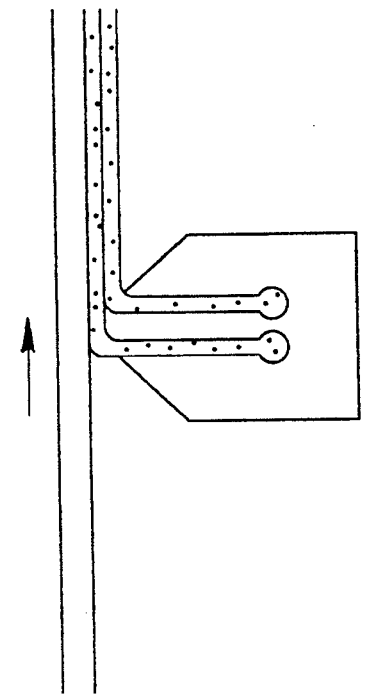
Figure 2:
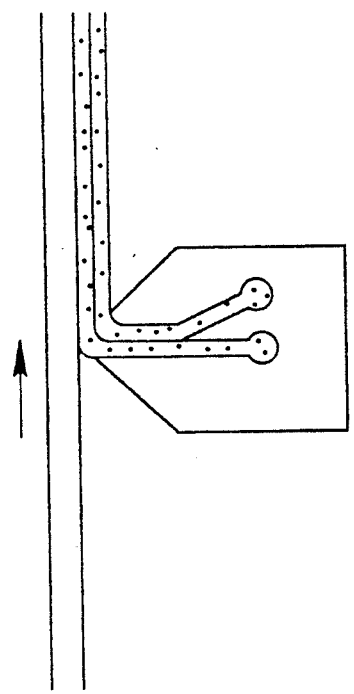

For the coater head, that illustrated in FIG. 2(c) is preferably used in the invention.

The above wet-on-wet multilayer coating method may be performed by an extruder coater in conjunction with a reverse roll or gravure roll, Furthermore, an air doctor coater, blade coater, air knife coater, squeeze coater, impregnating coater, transfer roll coater, kiss roller, cast coater, and spray coater may be used in conjunction.

In the above multilayer-forming wet-on-wet method, a magnetic layer is formed on a still wet lower layer, thereby the surface of the lower layer (that is, the interface between the magnetic and lower layer) as well as the magnetic layer surface become smoother. In adhesion, contact between the magnetic layer and lower layer improves. The resultant magnetic recording medium can satisfy higher output level and low noise level i.e. particularly requirements for high-density recording, making it suitable as a magnetic recording tape. In addition, the recording medium has increased film strength and is free from delamination, thus resulting in increased durability. Further the method reduces the tendency of signal drop-outs, resulting in increased reliability of a magnetic recording medium.

Examples of the solvent to be contained in the above coating compositions include ketones such as acetone, methyl ethyl ketone, methyl isobutyl ketone, and cyclohexanone; alcohols such as methanol, ethanol, propanol, and butanol; esters such as methyl acetate, ethyl acetate, butyl acetate, ethyl lactate, ethylene glycol monoacetate; ethers such as glycol dimethyl ether, glycol monoethyl ether, dioxane, and tetrahydrofuran; aromatic hydrocarbons such as benzene, toluene, and xylene; and halogenated hydrocarbons such as methylene chloride, ethylene chloride, carbon tetrachloride, chloroform, and dichlorobenzene. These solvents may be used singly or in combination of two or more types.

The magnetic field strength of the orientating or perpendicularly orientating magnets is about 20 to 10000 gauss. The drying temperature in the dryer is about 30 to 120° C. The drying time is about 0.1 to 10 minutes.

As a next step, smoothing treatment is performed by calendering.

Then, the support is subjected to varnish or blade treatment as required, and then is slit into tapes. The above surface smoothing treatment is effective for the embodiment of the invention. That is, surface smoothing treatment is preferable to satisfy one requirement of the invention as stated above, namely surface roughness of magnetic layer. Calendering conditions affecting surface smoothing treatment include temperature, linear pressure, and c/s (coating speed).

In order to accomplish the object of the invention, it is usually preferable to maintain the above temperature in the range of 50° to 140° C., the above linear pressure in the range of 50 to 400 kg/cm, and the c/s in the range of 20 to 1000 m/min. When values fall outside these ranges, it may be either difficult or impossible to obtain the surface conditions of magnetic layer as specified by the invention.

According to the invention, a magnetic recording medium which can prevent staining on calender rolls while maintaining high electromagnetic characteristics can be provided.

EXAMPLES

The present invention is ilustarated by means of examples.

The following ingredients, amounts of ingredients, and order in which procedures are carried out may be altered as long as the effect of the invention is not adversely affected. In the examples, "parts" means parts by weight.

EXAMPLE 1

Magnetic coating compositions for the uppermost and lower layers were prepared by kneading and dispersing each of the following ingredients using a kneader sand mill.

| [Magnetic Coating Composition for the Uppermost Layer] | |
|---|---|
| Fe—Al based ferromagnetic metallic powder (Fe:Al wt % ratio = 100:3.5 (whole layer); ratio of Fe:Al atoms = 50:50 (surface); average major axis diameter: 0.12 μm; crystal size: 140 Å; axial ratio: 8; Hc: 1800 Oe; BET specific surface area: 55 m$^2$/g) | 100 parts |
| Vinyl chloride based resin containing potassium sulfonate group (MR-110, produced by Nippon Zeon Co., Ltd.) | 10 parts |
| Polyurethane containing sodium sulfonate groups (UR-8700, produced by Toyobo Co., Ltd.) | 10 parts |
| α-alumina (average grain size 0.2 μm) | 8 parts |
| Stearic acid | 1 part |
| Myristate acid | 1 part |
| Butyl stearate | 1 part |
| Cyclohexanone | 100 parts |
| Methyl ethyl ketone | 100 parts |

-continued

| | |
|---|---|
| Toluene | 100 parts |
| [Nonmagnetic Coating Composition for Lower layer] | |
| α-Fe$_2$O$_3$ | 100 parts |
| (Major axis diameter: 0.24 μm; minor axis diameter: 0.03 μm; axial ratio: 8; BET specific surface area: 38 m$^2$/g) (Si content in α-Fe$_2$O$_3$: 1.2 wt %; Al content in α-Fe$_2$O$_3$: 0.2 wt %) | |
| Vinyl chloride resin containing potassium sulfonate group [MR-110, produced by Nippon Zeon Co., Ltd.] | 12 parts |
| Polyurethane resin containing sodium sulfonate groups (UR-8700, produced by Toyobo Co., Ltd.) | 8 parts |
| α-alumina (0.2 μm) | 5 parts |
| Carbon black (15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

Five parts by weight of copolyisocyanate compound (Coronate produced by Nippon Polyurethane Industry Co., Ltd.) was added to each of the obtained coating composition for the uppermost layer and that for the lower layer.

EXAMPLES 1 TO 5 AND COMPARATIVE EXAMPLES 1 TO 3

To a 10 μm-thick polyethylene terephthalate film, the above coating composition for the magnetic layer containing magnetic powder and that for the nonmagnetic layer containing nonmagnetic powder (shown in Table 1) were applied using the wet-on-wet method. Then, the magnetic field was oriented while the coating film was still wet. After drying, the film was subjected to surface smoothing treatment by calendering, so that the non-magnetic bottom and magnetic uppermost layer had a varied thickness and plastic deformation shown in Table 1.

Further, to the above polyethylene terephthalate film (backside) located opposite to the magnetic layer, the following coating composition was applied. This coating film was then dried and subjected to calendering treatment, so that a wide web of magnetic recording medium with a back coating layer 0.8 μm thick was obtained.

| | |
|---|---|
| Carbon black (Laben 1035) | 40 parts |
| Barium sulfate (average grain size: 300 nm) | 10 parts |
| Nitrocellulose | 25 parts |
| Polyurethane resin (N-2301, produced by Nippon Polyurethane Industry Co., Ltd.) | 25 parts |
| Polyisocyanate compounds (Coronate L, produced by Nippon Polyurethane Industry Co., Ltd.) | 10 parts |
| Cyclohexanone | 400 parts |
| Methyl ethyl ketone | 250 parts |
| Toluene | 250 parts |

The so-obtained web of magnetic recording medium was slitted to prepare an 8 mm-video magnetic recording medium. This recording medium was subjected to the following test and evaluated. The results are shown in Table 1.

Electrical Characteristics (dB): RF Output

The RF output of the 8 mm video camera CCDV-900 (produced by Sony Corporation) at 7 MHz was measured.

Running Durability

Repeated running durability under a temperature of 40° C. and humidity of 80 % RH was measured and evaluated as follows.
A: No problem
B: Tape running, but D/O frequently exceeds 50.
C: Tape running, but electrical characteristics decreases by 2 dB or more.
D: Tape stops.

Staining on Calender Rolls

After calendering 20,000 m of magnetic recording medium at a temperature of 120° C. and linear pressure of 300 kg/cm, staining on the metallic calender rolls was visually inspected.
A: No staining
B: Slight staining
C: Apparent staining Head Clogging Test An 8 mm video deck was modified and a 120-minute tape was subjected to full-length repeated running for 50 passes under a temperature of 40° C. and humidity of 2.0 % HR. The number of times the magnetic head was clogged was counted.

Magnetic powder type A: Ferromagnetic metallic powder

Magnetic powder type B: Barium ferrite
(BET specific surface area: 40 m$^2$/g; average grain size: 450 Å; tabular ratio: 3.5; Hc: 1200 Oe; Saturation magnetization (σs):. 65 emu/g)

Powder type X: α-Fe$_2$O$_3$

Powder type Y: α-FeOOH (major axis diameter: 0.20 μm; minor axis diameter: 0.018 μm; axial ratio: 11; BET specific surface area: 45 m$^2$/g; Si content in α-FeOOH: 0.9 wt %, Al content in α-FeOOH: 0.1 wt %)

Z-1: Fe-Si-Al sendust alloy powder (Hc=40 A/m; μi=200 H/A); average grain size: 0.2 μm Powder Type: Z-2

Z-2 was prepared in the same way as the above highly permeable magnetic material comprising composition I, except that 70 wt % of Fe-Si-Al sendust alloy powder and 30wt % of TiO$_2$ having a grain size of 0.03 μm were used in place of 100 wt % Fe-Si-Al sendust alloy powder.

Powder Type: Z-3

Z-3 was prepared in the same way as the above highly permeable magnetic material comprising composition I, except that 100 wt % of Mn-Zn ferrite [MnO: 18 wt %, ZnO: 14 wt %, and Fe$_2$O$_3$; Hc=700 (A/m); μi=80 (H/m); grain size: 0.1 μm] was used in place of 100 wt % of Fe-Si-Al sendust alloy powder.

Powder Type: Z-4

Z-4 was prepared in the same way as the above highly permeable magnetic material comprising coating composition I, except that 100 wt % of Ni-Zn ferrite [NiO: 19 wt %, ZnO: 13.5 wt %, and Fe$_2$O$_3$:67.5 wt %; Hc=1,000 (A/m); μi=50 (H/m); grain size: 0.1 μm] was used in place of 100 wt % of Fe-Si-Al sendust alloy powder.

TABLE 1

| Example | Example | Example | Example | Example | Comparative | Comparative | Comparative |

TABLE 1-continued

| | | 1 | 2 | 3 | 4 | 5 | example 1 | example 2 | example 3 |
|---|---|---|---|---|---|---|---|---|---|
| Uppermost Layer | Magnetic powder type | A | A | A | A | B | A | A | A |
| | Polyurethane Tg (°C.) | −20 | 70 | −20 | 0 | −20 | 70 | −25 | −20 |
| | Addition amount of polyurethane (wt %) | 10 | 14 | 4 | 8 | 10 | 16 | 16 | 10 |
| | Plastic deformation (μm) | 0.20 | 0.01 | 0.1 | 0.5 | 0.10 | 0.005 | 0.6 | 0.20 |
| | Film thickness (μm) | 0.5 | 0.2 | 0.2 | 0.5 | 0.3 | 0.3 | 0.8 | 0.4 |
| Lower Layer | Powder type | X | X | Y | Z-1 | X | X | X | — |
| | Axial ratio | 8 | 9 | 11 | 1 | 7 | 10 | 8 | — |
| | Polyurethane Tg (°C.) | −20 | +70 | −20 | +10 | −20 | −20 | 0 | — |
| | Addition amount of polyurethane (wt %) | 8 | 16 | 6 | 10 | 8 | 8 | 10 | — |
| | Plastic deformation (μm) | 0.25 | 0.01 | 0.1 | 0.45 | 0.15 | 0.25 | 0.2 | — |
| | Film thickness (μm) | 1.0 | 0.3 | 1.3 | 1.0 | 0.7 | 1.2 | 1.0 | — |
| Results (dB) | RF output at 7 MHz | 3.0 | 2.0 | 1.5 | 2.0 | 2.0 | 0.0 | −3.0 | −4.5 |
| | Staining on calender rolls | ○ | ○ | ○ | ○ | ○ | x | x | x |
| | Head clogging test | 0 | 0 | 0 | 0 | 0 | 13 | 30 | 3 |

| | | Example 6 | Example 7 | Example 8 | Example 9 | Example 10 | Example 11 | Example 12 |
|---|---|---|---|---|---|---|---|---|
| Uppermost Layer | Magnetic powder type | A | A | A | A | B | B | A |
| | Polyurethane Tg (°C.) | 0 | 0 | 0 | 0 | −20 | 0 | −20 |
| | Addition amount of polyurethane (wt %) | 8 | 8 | 8 | 8 | 4 | 8 | 10 |
| | Plastic deformation (μm) | 0.5 | 0.5 | 0.5 | 0.5 | 0.1 | 0.5 | 0.20 |
| | Film thickness (μm) | 0.3 | 0.3 | 0.3 | 0.3 | 0.3 | 0.3 | 0.2 |
| Lower Layer | Powder type | Z-1 | Z-2 | Z-3 | Z-4 | Y | Z-1 | X |
| | Axial ratio | 1 | 1 | 1 | 1 | 11 | 1 | 8 |
| | Polyurethane Tg (°C.) | +10 | +10 | +10 | +10 | −20 | +10 | −20 |
| | Addition amount of polyurethane (wt %) | 10 | 10 | 10 | 10 | 6 | 10 | 8 |
| | Plastic deformation (μm) | 0.45 | 0.43 | 0.43 | 0.44 | 0.1 | 0.45 | 0.25 |
| | Film thickness (μm) | 1.0 | 1.0 | 1.0 | 1.0 | 1.3 | 1.0 | 1.0 |
| Results (dB) | RF output at 7 MHz | 2.7 | 2.0 | 2.4 | 2.3 | 1.0 | 1.2 | 3.8 |
| | Staining on calender rolls | ○ | ○ | ○ | ○ | ○ | ○ | ○ |
| | Head clogging test | 0 | 0 | 0 | 0 | 0 | 0 | 0 |

We claim:

1. A magnetic recording medium comprising a support and a plurality of layers thereon, said plurality comprising an uppermost magnetic layer, which contains a binder and has a plastic deformation A of 0.01 to 0.5 μm, and at least one intermediate layer comprising a non-magnetic powder or a substance having a coercive force of from more than 0 to $1.0 \times 10^4$ A/m.

2. The magnetic recording medium of claim 1 wherein said substance is selected from the group consisting of soft magnetic metallic materials and soft magnetic oxide materials.

3. The magnetic recording medium of claim 1 wherein said intermediate layer has a plastic deformation B of 0.01 to 0.6 μm.

4. The magnetic recording medium of claim 3 wherein $0.7 \, A \leq B \leq 1.3 \, A$.

5. The magnetic recording medium of claim 1 wherein the layer thickness of said magnetic layer is less than 0.05 μm.

6. The magnetic recording medium of claim 1 wherein said magnetic layer comprises hexagonal magnetic powder.

7. The magnetic recording medium of claim 6 wherein said hexagonal magnetic powder is barium ferrite.

8. The magnetic recording medium of claim 1 wherein said intermediate layer comprises non-magnetic powder.

9. The magnetic recording medium of claim 8 wherein said non-magnetic powder is needle-shaped $\alpha$-$Fe_2O_3$ or $\alpha$-FeOOH.

10. The magnetic recording medium of claim 1 wherein said intermediate layer comprises magnetic powder having a coercive force of from more than 0 to $1.0 \times 10^4$ A/m, said magnetic powder being selected from soft magnetic metallic materials and soft magnetic oxide materials.

11. A magnetic recording medium comprising a support, a lower layer and an uppermost magnetic layer wherein said uppermost layer comprises a binder and hexagonal magnetic barium ferrite and has a plastic deformation A of 0.01 to 0.05 $\mu$m; said lower layer comprising a binder and a non-magnetic powder or a magnetic powder selected from the group consisting of soft magnetic metallic materials and soft magnetic oxide materials, said lower layer having a plastic deformation B of 0.01 to 0.6 $\mu$m; and 0.7 A $\leq$ B $\leq$ 1.3 A.

* * * * *